May 19, 1953  A. FISCHBACH  2,639,306
PILE BATTERY FABRICATION
Filed Feb. 2, 1951

INVENTOR.
ADOLPH FISCHBACH
BY Harry M. Saragovitz
Attorney

Patented May 19, 1953

2,639,306

UNITED STATES PATENT OFFICE 2,639,306

PILE BATTERY FABRICATION

Adolph Fischbach, Ocean Township, Monmouth County, N. J., assignor to the United States of America as represented by the Secretary of the Army Application February 2, 1951, Serial No. 209,194

1 Claim. (Cl. 136—112)

(Granted under Title 35, U. S. Code (1952), sec. 266)

The invention described herein may be manufactured and used by or for the Government for governmental purposes, without the payment of any royalty thereon.

This invention relates to a primary deferred action cell of pile type construction using the electro-chemical system magnesium-water-cuprous chloride. A battery of this type, that is particularly applicable here, is described in the patent application of Grenville B. Ellis for a Magnesium-Cuprous Chloride Reserve Battery, of July 31, 1950, Serial No. 176,889.

Deferred action batteries of the magnesium-water cuprous chloride type have attained considerable importance as "meteorological" or "one-shot" batteries due to their high capacity per unit of weight and volume, their excellent operating characteristics even at low temperatures and their ease of activation with water.

One of the objects of this invention is to provide a pile type construction of a deferred-action, magnesium-cuprous chloride battery which lends itself to low cost mass production while resulting in a battery of lighter weight, smaller size, and more dependable performance.

Another object of this invention is to provide a battery of pile type construction wherein the adjacent electrodes of a series of cells are welded together, resulting in fewer parts, adapted for assembly with fewer operations and being more rugged and simpler in structure and therefore less liable to damage.

These and other objects will become apparent from the following description and accompanying illustration of specific embodiments of the inventive idea.

Figure 2:
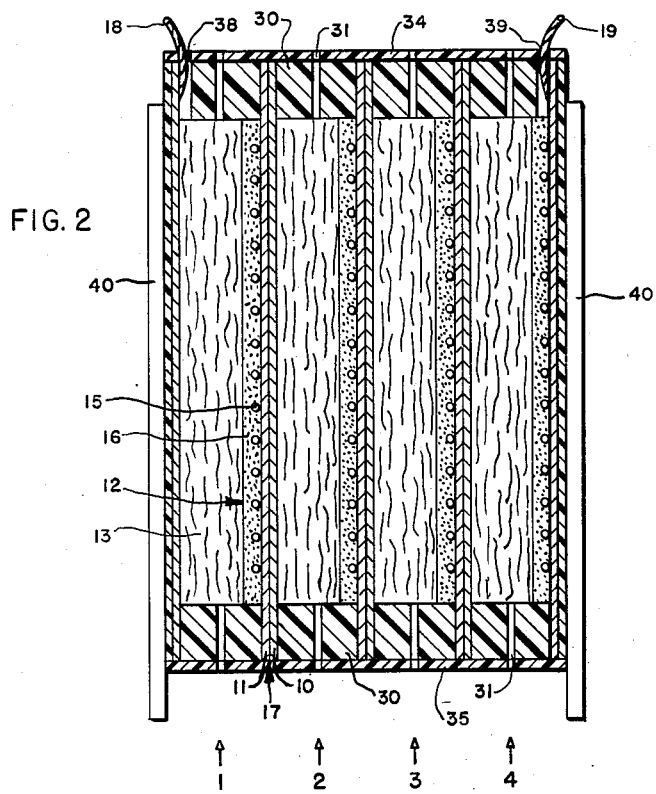
Fig. 2 is an enlarged view of a vertical section taken along the line AA of Fig. 1.

The pile type battery shown in Fig. 2 consists of four cells, 1, 2, 3 and 4, each cell comprising a cuprous chloride carrying electrode 12, a thin magnesium plate 10 and a spacer 13 of bibulous electrolyte retaining material.

In order to provide a fluid-tight electrical connection of low internal resistance between the individual cells, the thin magnesium electrode is covered on one side with a sheet 11 consisting of a layer of conducting and liquid-tight material, as for instance, copper. As shown in Fig. 2, the magnesium sheet 10 and the copper sheet 11 constitute a unitary bi-metallic plate 17 disposed in such a manner that the magnesium sheet 10 of the plate 17 forms the anode or negative electrode of one cell while the copper sheet 11 of the same electrode of one cell plate 17 faces and electrically contacts the cuprous chloride electrode of the adjacent cell.

The cuprous chloride electrode, instead of being held against the copper sheet to maintain as low an electrical resistance as possible by contact and pressure, is formed on the grid 15 after the grid has been electrically secured to the copper plate 11. This is easily accomplished by welding or soldering the screen 15 to the copper plate 11 before applying the cuprous chloride paste.

This, in effect serves to simplify the assembly procedure, and the finished structure 15, 16 and 17 can be cut into the desired plate sizes to be mounted in stacks. This method requires less handling and insures contact between the positive, cuprous chloride and the negative, copper-magnesium sheets of the adjacent cells.

The sheet 11 may also consist of conducting and liquid-tight material other than copper, provided such material does not interfere with the function of the cell. In other words, the material must be impermeable to liquids, a good electrical conductor and must not be affected by the chemical and electro-chemical reactions that are going on in the cell. Thus, instead of copper, other metals, e. g., silver, gold, platinum or alloys of the same may be used. These metals may be deposited upon the magnesium sheet 10 by electrolysis or by other suitable methods capable of providing a laminated, closely connected structure of the two sheets 10 and 11. To reduce the electrical resistance of the laminated plate 17 to a minimum, the contact between sheets 10 and 11 should take place upon the whole surface. However, satisfactory contact may be achieved by sewing or stitching together sheets 11 and 10, or by crimping their adjacent ends together.

Instead of metals, other materials such as graphite or mixtures of graphite and carbon with or without an agglomerating substance such as resin, tar or synthetic plastics may also be used for providing the conducting, liquid-tight layer 11 of the laminated plate structure 17. However the material that is chosen must be capable of bonding to the screen 15.

If a suitable mechanical and electrical bonding can be achieved, one of the conductive plastics can be used. Making the sheet 11 of conductive plastic improves the electric characteristics of the cell and reduces considerably the costs of manufacture. Such conductive plastics may consist of any suitable plastic material containing a conductive filler, as for instance, powdered graphite or metal powder or metal organic compounds. Both the plastic material and the filler must be of such nature as to avoid any undesired reaction with the chemical products within the cell.

The supporting grid 15 may consist of a wire screen of copper, bronze, lead, stainless steel, or any other suitable conductive material which does not appreciably affect the electrical characteristics of the cell. The grid 15 carries a dried paste 16 of finely ground cuprous chloride. The cuprous chloride paste can be applied to the side of the screen away from the composite sheet 17, with or without a suitable binder and water as required, after blanking off the edges of the composite sheet. The paste 16 is of porous character and may contain an inert conductive material, as, for instance, finely ground graphite or carbon black.

The spacer 13 conventionally consists of paper, wood pulp, microporous rubber, glass-wool, rayon (viscose) felt, or other liquid retaining materials, inert to the action of the substances produced during the electro-chemical actions of the cell. The thickness of the spacer 13 is designed to soak up enough electrolyte to allow complete utilization of the active materials of the electrodes.

The above described cell elements can be very quickly and simply assembled in a pile type battery by means of an aligning frame, stacking together first the bi-metallic plate 17 with the copper surface face 11 down, and then the spacer 13 of bibulous material resting on the magnesium face 10 of the bi-metallic plate 17, the cuprous chloride side of a unit welded to a copper-magnesium plate is placed next to the spacer 13, and these latter units are alternated with the spacers until the desired number of cells such as 1, 2, 3 and 4 of Fig. 2 are assembled, and the stack is terminated with a cuprous chloride element. The end cells 1 and 4 are provided with electric terminals 18 and 19 respectively.

An outer hull 20 peripherically surrounds the pile assembly holding the stacked cells 1, 2, 3 and 4 together under pressure contact while leaving top and bottom of these cells open. The outer hull 20 may consist of polystyrene sheet material or sheets from various other polyvinyl resins or the like. The hull may also be produced by winding pressure-sensitive cellulosic tape (e. g., Scotch tape) peripherically around the pile assembly.

Prior to providing the outer hull 20, the sides of the pile structure which show the lateral edges of the plates 17 may be coated with a liquid-tight seal (not shown) using, for instance, pitch, wax or any hardenable plastic material which, on hardening, closes the openings between the lateral edges of said plates 17.

Figure 1:
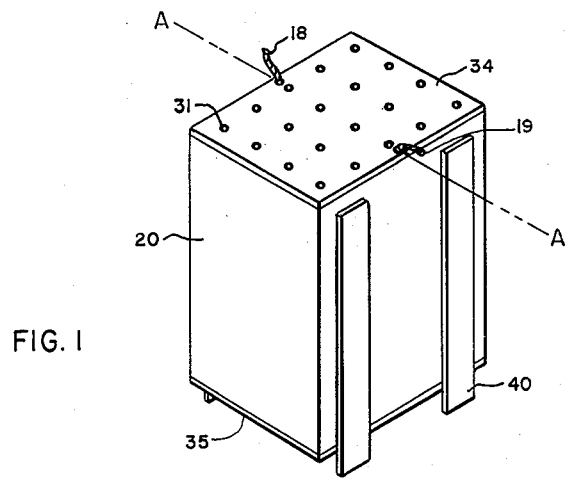
Fig. 1 is a perspective view of a complete meteorological battery in a plastic encasement.

The open top and bottom of the pile may or may not be sealed with a suitable plastic material 30 conventionally used for such purposes. If a seal is provided, apertures 31 must be left within the same to allow the entrance of the electrolyte and, conversely, the escape of air while the electrolyte is entering the cells. This may be conveniently done by inserting pins (not shown) in the sealing compound and removing them after hardening of the latter. Top and bottom of the pile assembly may then be covered by a top sheet 34 and a bottom sheet 35 both made from polystyrene or any other suitable insulating plastic material. Top and bottom sheets 34 and 35 are provided with apertures corresponding to the apertures 31 of the sealing compound 30. The top sheet 34 has openings 38 and 39 (see Figs. 1 and 2) for the respective terminals 18 and 19. Supporting strips 40 which extend below the hull 20 serve as legs to hold the battery in a raised position.

The assembled battery is activated by immersing the same in water which may contain small amounts of hydrochloric acid or sodium chloride or other ionizable substances which tend to favorably alter the operating characteristics of the battery. The addition of sodium chloride or other suitable chlorides to the electrolyte results in a somewhat greater cell voltage and also brings the voltage up more rapidly, than water alone.

Having described my invention in connection with specific embodiments, I claim:

A deferred action primary battery comprising a pile of flat cell units, each of said flat cell units consisting of a thin magnesium electrode, a cuprous chloride electrode, a spacer of bibulous electrolyte retaining material between said electrodes, a thin, flat, electrically conducting plate of liquid-tight material disposed between said cuprous chloride carrying electrode of one cell and the magnesium electrode of the adjacent cell, said conducting plate and said magnesium electrode being welded together and said conducting plate and the cuprous chloride carrying electrode being welded together to form a unitary structure constituting at once a physical barrier with respect to the electrolyte and an electrical interconnection of low resistance between adjacent cells.

ADOLPH FISCHBACH.

References Cited in the file of this patent

UNITED STATES PATENTS

| Number | Name | Date |
| --- | --- | --- |
| 2,040,255 | Gordon | May 12, 1936 |
| 2,322,210 | Adams | June 22, 1943 |
| 2,428,850 | Lawson | Oct. 14, 1947 |
| 2,441,896 | Moir | May 18, 1948 |
| 2,475,152 | Rock | July 5, 1949 |
| 2,564,495 | Mullen | Aug. 14, 1951 |
| 2,582,973 | Ellis | Jan. 22, 1952 |

FOREIGN PATENTS

| Number | Country | Date |
| --- | --- | --- |
| 668,569 | France | July 15, 1929 |
| 771,012 | France | July 16, 1934 |
| 443,983 | Great Britain | Mar. 11, 1936 |
| 867,151 | France | July 7, 1941 |

OTHER REFERENCES

"Materials and Methods," December 1946, pages 1469–1472.